(No Model.) 2 Sheets—Sheet 1.

J. GIFFORD.
FRICTION CLUTCH.

No. 392,423. Patented Nov. 6, 1888.

Witnesses:
J. Staib.
Chas. H. Smith.

Inventor:
James Gifford.
per Lemuel W. Serrell.
Atty (No Model.) 2 Sheets—Sheet 2.
J. GIFFORD.
FRICTION CLUTCH.
No. 392,423. Patented Nov. 6, 1888.
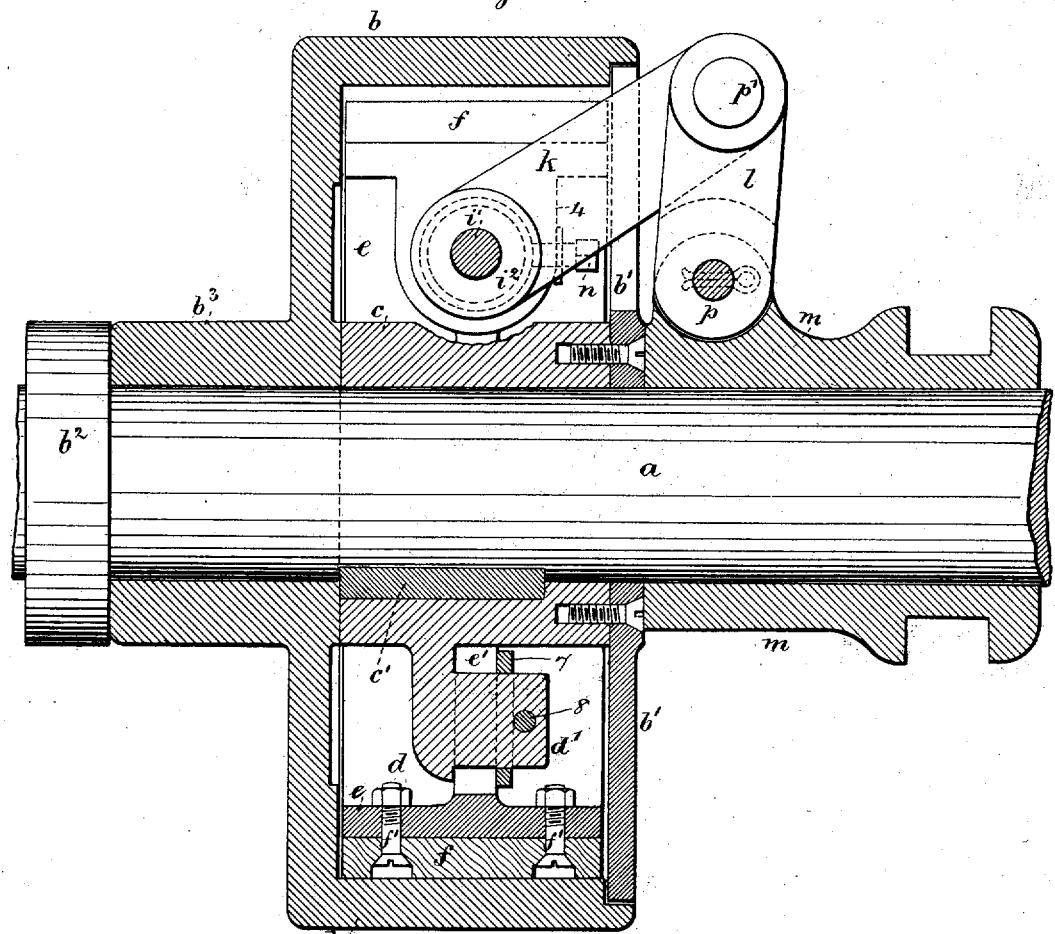
Witnesses:
J. Staib.
Chas. H. Smith.
Inventor:
James Gifford
per Lemuel W. Serrell
Atty.

ized and State of
UNITED STATES PATENT OFFICE.

JAMES GIFFORD, OF HUDSON, NEW YORK, ASSIGNOR TO GIFFORD BROTHERS, OF SAME PLACE.

FRICTION-CLUTCH.

SPECIFICATION forming part of Letters Patent No. 392,423, dated November 6, 1888.

Application filed May 21, 1888. Serial No. 274,502. (No model.)

*To all whom it may concern:*

Be it known that I, JAMES GIFFORD, of Hudson, in the county of Columbia and State of New York, have invented an Improvement in Friction-Clutches, of which the following is a specification.

My invention relates to an improved friction-clutch adapted for use in transmitting power either from a driving-belt and drum or gear to a shaft whereby said shaft is revolved, or from a shaft to a drum or gear whereby the drum or gear is revolved and motion thereby communicated to operate various mechanisms.

My improvement relates, especially, to the combination, with a loose drum or gear, of internal expanding segments, which segments are adapted to be moved outwardly or inwardly by right and left hand screws operated by a sliding sleeve, which segments in their turn operate a driving-hub and its attendant ears and trunnions, or are operated by said driving-hub, ears, and trunnions, and which hub is keyed to the driving or driven shaft; and my improvement further relates in the peculiar means of connecting the threaded nuts in the expanding segments securely to said segments, so that they are prevented from turning during the operation of the clutch.

Figure 1:
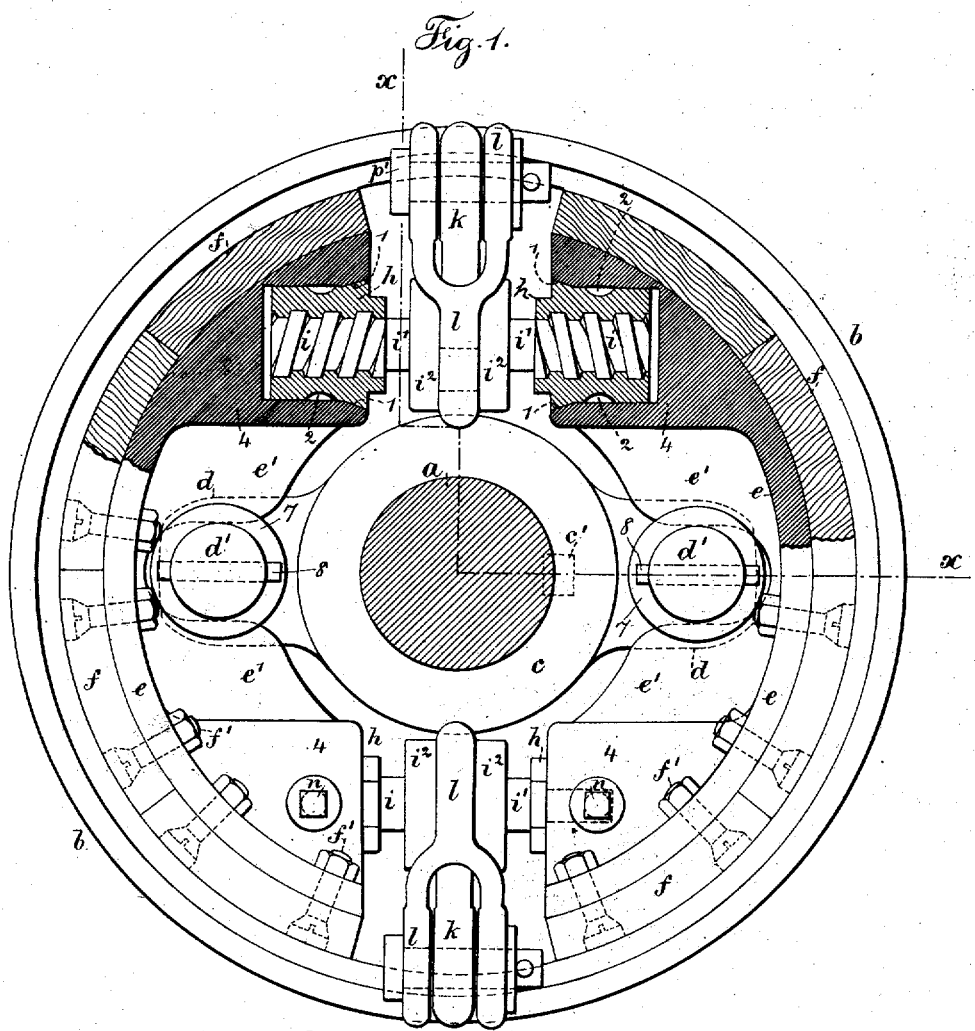
Figure 3:
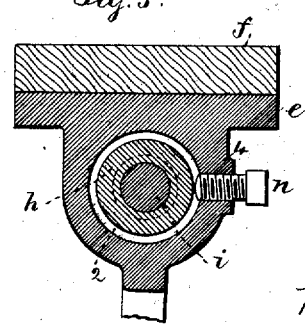

In the drawings, Figure 1 is a cross-section of my improved clutch, some of the parts being shown in elevation. Fig. 2 is a longitudinal section through a portion of the clutch at the line $x\,x$. Figs. 3 and 4 are detailed longitudinal sections of manners of fastening the threaded nuts in the expanding segments.

$a$ represents the main driving or driven shaft, by or through which other mechanisms are caused to operate.

$b$ represents a loose drum or pulley surrounding the shaft $a$ and revolving between the disk or end cover, $b'$, and the ring $b^2$, and upon the sleeve $b^3$ of this drum may be secured a pulley (around which may pass a belt) or a gear-wheel, either of which may act to convey and transmit power either to the shaft $a$ from a source of power or from the shaft $a$ as a source of power to mechanism to be driven.

The driving-hub $c$ is secured by a key, $c'$, to the shaft $a$, and said hub has cast with it ears $d$, extending out at each side of said hub, and at right angles to said ears there are trunnions $d'$ cast therewith, and there are rings or washers 7 around the trunnions $d'$, and pins 8, passing through said trunnions to retain the washers in place.

$e$ represents the body of the expanding segments, upon the inner side of which there are forked webs $e'$, which receive the trunnions $d'$ upon the ears $d$, the forked webs $e'$ being between the ears $d$ and washers 7, and said expanding segments are covered peripherally at $f$ with wood, leather, rawhide, or similar material in sections, and these sections are secured by bolts at $f'$ to the expanding segments $e$.

$h$ represents internally-threaded nuts, pairs of which are fitted into openings in opposite sides of the expanding segments $e$, and said nuts $h$ are beveled or made conical at 1 to fit the correspondingly-shaped openings made in the segments to receive them, and said nuts $h$ are grooved circumferentially at 2, and there are set-screws $n$ passing through the segments $e$, from the side the ends of which set-screws are received in the grooves 2, and when clamped against the nuts $h$ prevent them turning. Within said nuts $h$ there are right and left hand quick-pitch screws $i$, formed with the shaft $i'$ and the hub $i^2$, and connected with each hub $i^2$ there are links $k$ and yokes $l$, which connect said links to opposite sides of the sliding sleeve $m$, which sleeve $m$ surrounds the shaft $a$, and is capable of movement lengthwise upon said shaft by a lever whose forked end is received in the slot of the sleeve $m$, and there are openings in the disk $b'$, through which pass the links aforesaid.

I prefer to employ, as shown in the drawings, two expanding segments, $e$, which are slightly less than half a circle, and there are four of the nuts $h$, and two right and left hand quick-pitch screws, $i$, two shafts, $i'$, hubs $i^2$, links $k$, and yokes $l$, and in the position shown in the drawings the parts are in a position of action, the periphery of the segments being in contact with the internal surface of the drum $b$. If, now, the clutch-sleeve $m$ is moved away from the disk or cover $b'$ along the shaft, the links $k$ and yokes $l$ are brought more nearly into alignment with the axis of the shaft $a$, and the shafts $i'$ and their hubs $i^2$, and the right and left hand quick-pitch screws $i$ are given a partial revolution, which acts to free and move the expanding segments inwardly, bringing their periphery away from contact with the inner surface of the drum or pulley $b$. This drum or pulley $b$ may be constantly revolving, and in such instance the contact of the segments with it at once communicates motion through the trunnions $d'$, ears $d$, and driving-hub $c$ to the shaft $a$, the movement of said shaft communicating the desired power, and all of the parts, including the links, yoke, and sliding sleeve, now move with the drum or pulley $b$; or the shaft $a$ may be constantly revolving as the source of power, in which case the movement of the sliding sleeve and the expanding of the segments $e$ will communicate power to the drum $b$ and the pulley or gear connected therewith. The sleeve $m$ may slide on a feather upon the shaft $a$, or not, as may be desired.

The special object of beveling the edges of the nuts $h$ and fitting them into correspondingly-shaped openings in the segments $e$ is to frictionally wedge the nuts in place and assist in preventing them turning when the quick-pitch screws expand the segments against the interior of the drum, and to lock the segments securely in the expanded position shown in Fig. 1 the parts are so made that the pivots $p$ between the yokes and sliding sleeve are within a line drawn through the pivots $p'$, connecting the yokes and links.

The outer ends of the nuts $h$ may be made in the form of a hexagon adapted to receive a wrench or similar tool by which the nuts, when their set-screws are loosened, may be adjusted on the quick-pitch screws.

The construction shown in Fig. 4 consists in employing clamps $o$, which encircle the nuts $h$ in their peripheral groove at 2, said clamps being made with projecting ends $o'$, which are pressed together, the bands being tightly secured around the nuts $h$ by the bolts 5. In this instance the portion 4 of the expanding segments are slotted from their edge inwardly at 6, the slots being of a width equal to that across the projecting ends $o'$, and adapted to receive said ends $o'$, and the nuts $h$, together with the clamps $o$, are pushed into the segments $e$, and because of the friction of the clamps $o$ and the confinement in the slots at 6 the nuts $h$ are held rigidly and kept from turning. I may prefer to place the projecting ends $o'$ at an inclination of about forty-five degrees and to make an opening through the disk or end cover, $b'$, so that a screw-driver can be inserted to regulate the tension upon or the position of the nuts $h$.

I claim as my invention—

1. The combination, with the shaft $a$ and drum $b$, of expanding segments $e$, having forked or slotted webs $e'$ on the inner surface of said segments, the driving-hub $c$, within the drum $b$ and keyed to the shaft $a$, and having ears $d$ and trunnions $d'$, formed therewith and at right angles thereto and passing between the slotted webs, and with means, substantially as specified, for moving said segments, substantially as set forth.

2. The combination, in a friction-clutch, with the shaft $a$ and drum $b$, of the expanding segments $e$, the nuts $h$, having peripheral grooves at 2, bands or clamps in the peripheral grooves encircling the nuts, and screws or bolts for clamping the bands around the nuts $h$ to hold them in place in the segments and prevent rotation, and with mechanism, substantially as specified, for moving said segments, substantially as set forth.

3. The combination, in a friction-clutch, with the shaft $a$ and drum $b$, of the expanding segments $e$, the nuts $h$, having conical ends 1 and peripheral grooves at 2, bands or clamps in the peripheral grooves encircling the nuts, and set screws or nuts for clamping the bands around the nuts $h$ to hold them in place in the segments and prevent rotation, and with mechanism, substantially as specified, for moving said segments, substantially as set forth.

4. The combination, with the shaft $a$ and drum $b$, of a driving-hub $c$ within the drum and keyed to the shaft $a$, ears $d$, and trunnions $d'$, the expanding segments $e$, having forked webs $e'$, the right and left hand quick-pitch screws $i$, links, yokes, and sliding sleeve for operating the same, and the nuts $h$, in which the screws $i$ operate to expand the segments, said nuts being grooved peripherally and provided with means, substantially as set forth, for holding them, whereby they are rigidly secured to the segment, substantially as specified.

Signed by me this 14th day of May, A. D. 1888.

JAMES GIFFORD.

Witnesses:
GEO. T. PINCKNEY,
HAROLD SERRELL.